R. E. BIRDSONG.
SAFETY TRACTOR COUPLING.
APPLICATION FILED NOV. 29, 1921.
1,413,252.
Patented Apr. 18, 1922.
2 SHEETS—SHEET 1.
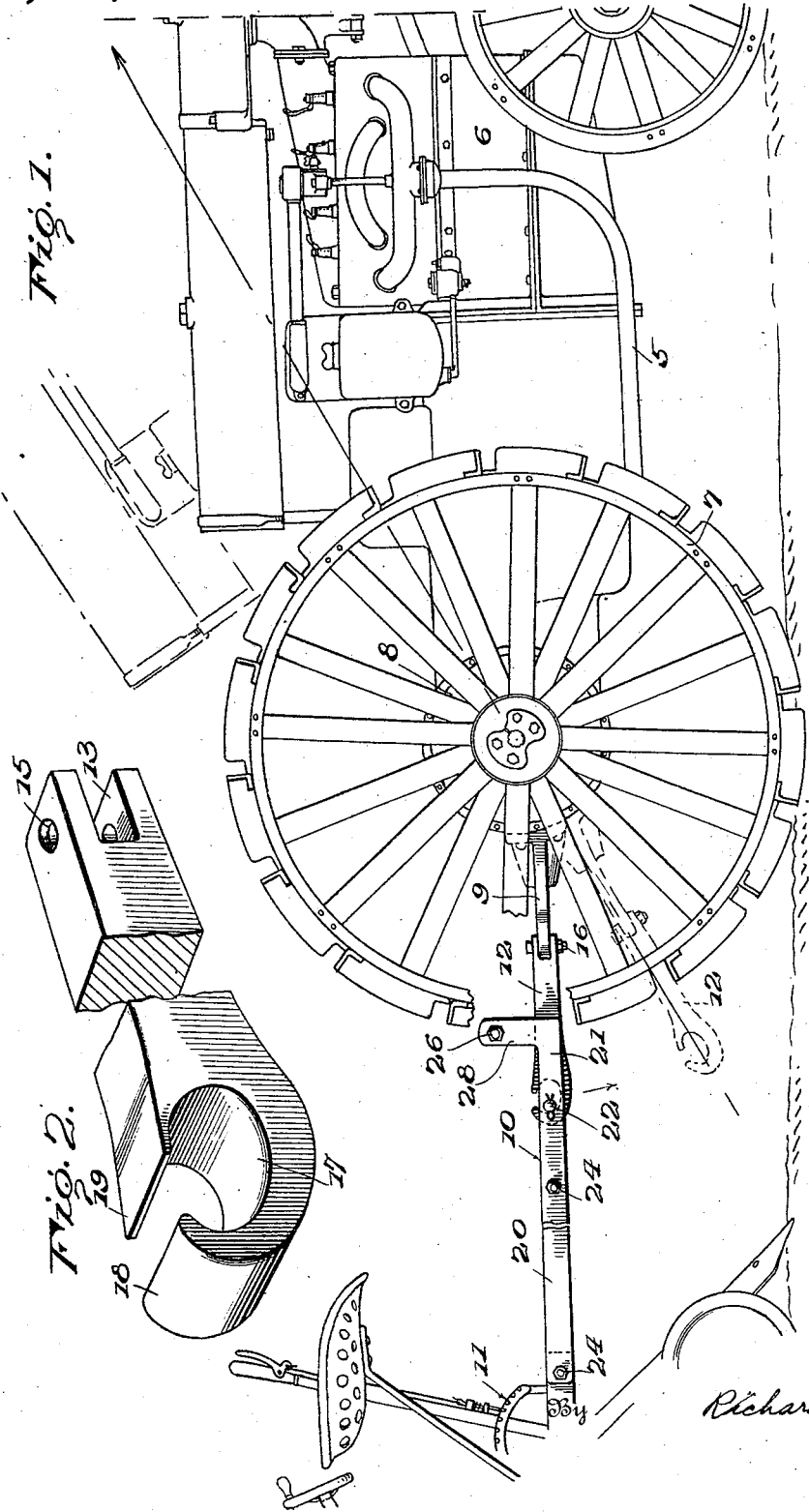
Inventor
Richard E. Birdsong

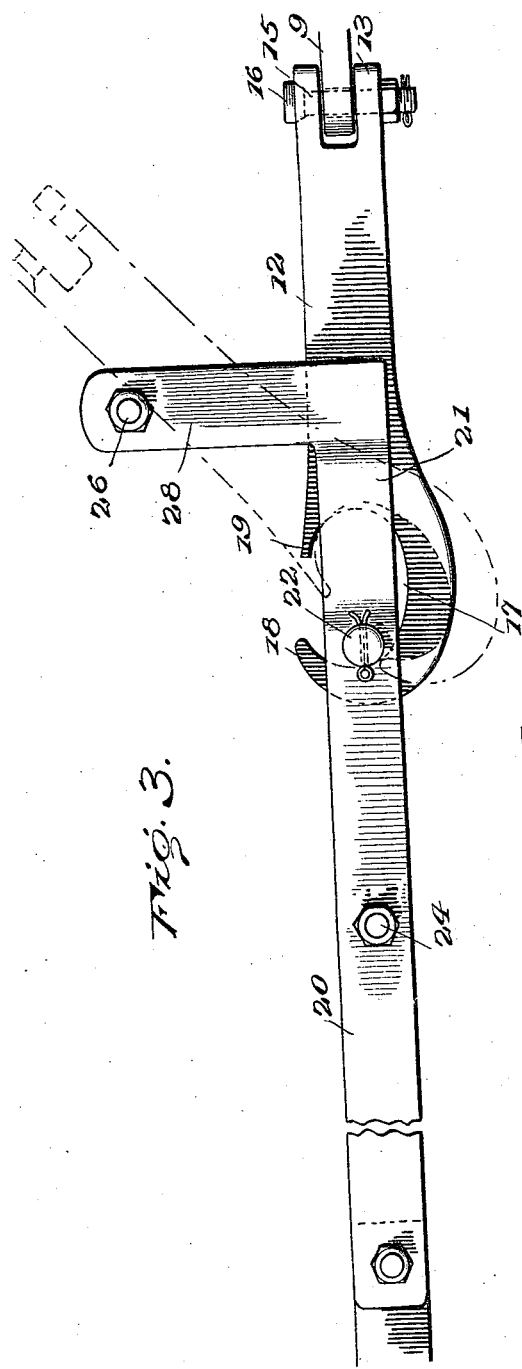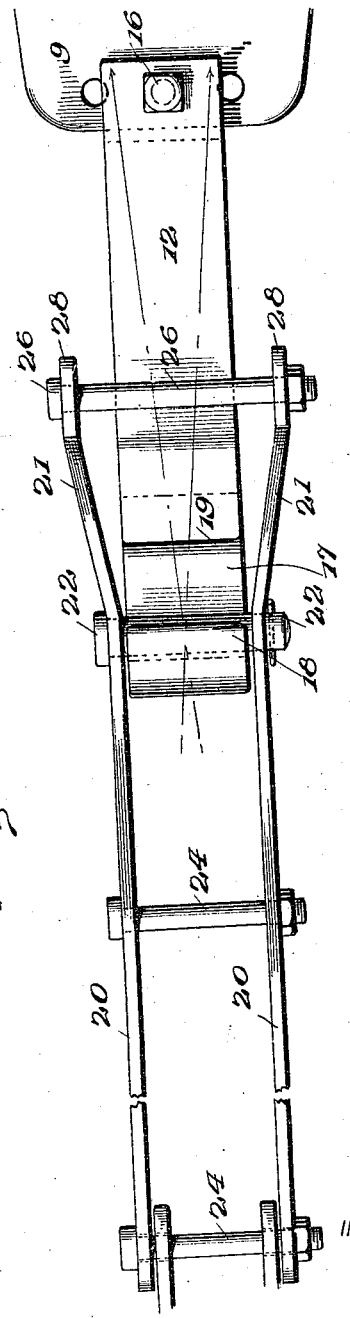

UNITED STATES PATENT OFFICE.

RICHARD E. BIRDSONG, OF MACON, GEORGIA.

SAFETY TRACTOR COUPLING.

1,413,252.  Specification of Letters Patent.  Patented Apr. 18, 1922.

Application filed November 29, 1921. Serial No. 518,717.

*To all whom it may concern:*

Be it known that I, RICHARD E. BIRDSONG, a citizen of the United States, residing at Macon, in the county of Bibb and State of Georgia, have invented certain new and useful Improvements in Safety Tractor Couplings, of which the following is a specification.

This invention relates to couplers especially adapted for use in connecting various ground working implements to a tractor.

An important object is to provide a coupler of the class described having novel means whereby the connection between the tractor and the implement is broken when the tractor tilts beyond a pre-determined degree so as to prevent the tractor from completely tipping over and injuring the operator.

A further object is to provide a coupler which is of highly simplified construction and, which, by reason of the few parts involved and the absence of coil springs or other yieldable power transmitting devices, may be readily and conveniently connected or disconnected.

Other objects and advantages of the invention will be apparent during the course of the following description.

In the accompanying drawing:

Figure 1 is a side elevation of the improved coupler applied.

Figure 2 is a fragmentary perspective of one of the coupling members.

Figure 3 is a side elevation illustrating the various positions assumed by the hook member of the coupler.

Figure 4 is a plan view of the coupler applied.

In the drawing, the numeral 5 designates a tractor of any desired type, the said tractor being provided with an internal combustion engine 6 which serves as an operating means for the traction wheels 7. As illustrated in Figure 1 the differential housing 8 is provided with a drawbar cap 9 to which the coupler generally designated by the numeral 10 is connected. The rear end of the coupler may be connected to an implement 11 of any desired type.

The improved coupler comprises a hook member 12 having its forward portion provided with a pair of ears 13 apertured as indicated at 15 for the reception of a pivot bolt 16, the said pivot bolt serving as a means for connecting the hook member 12 to the drawbar cap. The rear portion of the hook member is provided with a socket 17 partially closed by bills 18 and 19 which provide a restricted entrance opening to the socket.

A drawbar is associated with the hook member 12 and consists of a pair of spaced parallel side rods 20 having their forward terminal portions flared as indicated at 21 and provided with a transversely extending connecting pin 22 adapted to be received within the socket 17 to provide a connection between the drawbar and the hook 12. The intermediate portions of the side rods 20 are joined by a bolt 24 while the forward ends of the side rods 20 are joined by a releasing pin 26. With reference to Figures 1 and 3 it will be seen that the forward portions of the side rods 20 are extended upwardly at right angles as indicated at 28 so that the releasing pin is disposed above the hook member 12.

It is thus seen that when the tractor is tilted at an angle of approximately 30 degrees the releasing pin 26 will be engaged with the intermediate portion of the hook thereby forcing the connecting pin 22 out of the socket 17. This breaks the connection between the tractor and the implement so that the rearward tilting of the tractor will be stopped so as to prevent injury to the operator and damage to the tractor.

The tractor may be swung either to the right or to the left without straining the coupler as the forward portions of the side rods are flared outwardly so as to permit the hook 12 to swing.

The several parts of the coupler may be conveniently connected to the tractor and the implement and may also be conveniently connected to each other as the pin 22 merely has to be inserted into the socket 17. As no springs are employed the connection between the parts is positive and a steady drive is provided. The several parts are not easily broken and may be used in connection with a standard tractor and a variety of implements. When it is desired to release the connection between the hook and the drawbar it is merely necessary to reverse the tractor slightly and then remove the pin from the socket.

I claim:—

1. A coupler for tractors comprising a hook having its rear portion provided with a socket, a drawbar having a pair of side rods arranged on opposite sides of said hook and having their forward terminal portions extended upwardly, a connecting pin joining said side rods and adapted to be received in said socket, and a releasing pin joining the angularly extended end portions of said side rods and adapted for engaging said hook to break the connection between the hook and the drawbar.

2. The construction set forth in claim 1, said hook being provided with a pair of bills overhanging said socket to define a restricted opening.

3. The construction set forth in claim 1, the forward portions of said side rods being extended angularly whereby the hook may swing transversely.

In testimony whereof, I have affixed my signature in the presence of two witnesses.

RICHARD E. BIRDSONG.

Witnesses:
R. P. ROUGHTON,
C. M. CLIFTON, Jr.